United States Patent
Goold

[15] 3,701,547
[45] Oct. 31, 1972

[54] COUPLING UNITS FOR ARTICULATED VEHICLES

[72] Inventor: Raymond Goold, 3 Beaufort Road, Downend, Bristol, England

[22] Filed: March 16, 1970

[21] Appl. No.: 19,764

[30] Foreign Application Priority Data

March 19, 1969 Great Britain..........14,487/69

[52] U.S. Cl. ..............................280/432, 280/446 B
[51] Int. Cl. .............................................B62d 53/08
[58] Field of Search..............................280/432, 446

[56] References Cited

UNITED STATES PATENTS

| 2,461,212 | 2/1949  | Hanna   | 280/432 |
|-----------|---------|---------|---------|
| 2,692,145 | 10/1954 | Hammond | 280/432 |
| 3,250,547 | 5/1966  | Myers   | 280/432 |
| 3,332,706 | 7/1967  | Miller  | 280/432 |
| 3,353,841 | 11/1967 | Neal    | 280/432 |

FOREIGN PATENTS OR APPLICATIONS

| 902,223 | 1/1954 | Germany | 280/432 |

*Primary Examiner*—Leo Friaglia
*Attorney*—Cushman, Darby and Cushman

[57] ABSTRACT

The coupling unit of an articulated vehicle is locked to prevent jacknifing or trailer swing, by releasable locking means which may be mechanical or hydraulic. The locking means are selectively released only in response to steering movements of the vehicle, so as to permit limited and preferably unidirectional, relative angular movement of the tractor and trailer, only by an amount and in a direction determined by the magnitude and sense of the steering movements.

9 Claims, 10 Drawing Figures

INVENTOR
RAYMOND GOOLD
BY Cushman, Darby & Cushman
ATTORNEYS

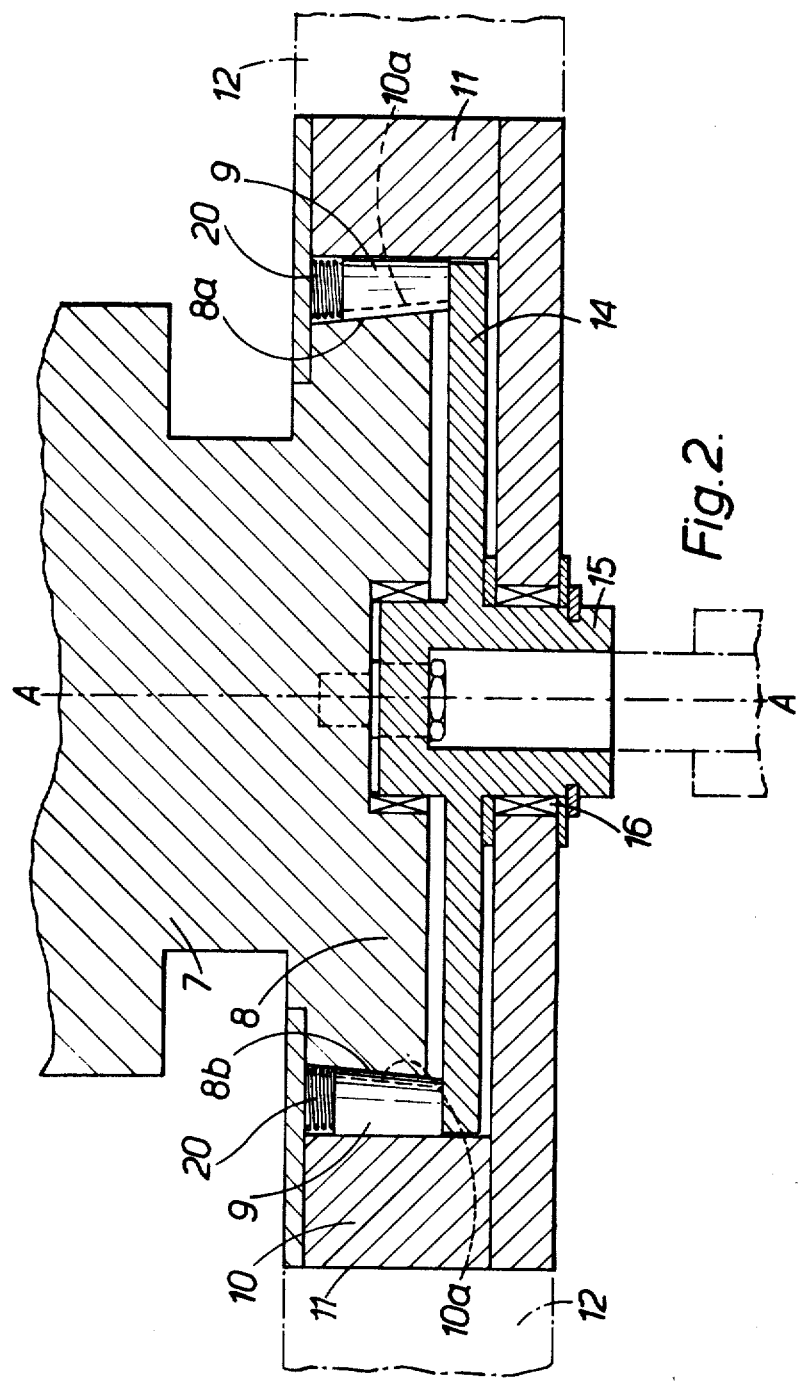

INVENTORS:
RAYMOND GOLD

BY Cushman Darby & Cushman
ATTORNEYS.

COUPLING UNITS FOR ARTICULATED VEHICLES

This invention relates to a coupling unit for an articulated vehicle.

The term "articulated vehicle" as used in the present specification includes any vehicle combination comprising a trailer which is drawn by a tractor and which is pivotable at its front end relative to the tractor about a generally vertical axis. The term therefore includes not only articulated lorries or trucks but also tractor/trailer combinations such as a motor car and a caravan or a truck towing a train of trailers.

In operation, usually under braking, instability can occur in such vehicles. This takes the form of uncontrolled slewing of the tractor about the trailer, known as jacknifing, or of the trailer about the tractor, known as trailer swing.

An object of the present invention is to provide an articulated vehicle coupling unit which is effective to prevent uncontrolled relative rotation of the tractor and trailer of an articulated vehicle when fitted thereto.

The present invention provides an articulated vehicle coupling unit including a tractor part and a trailer part for attachment to the tractor and trailer respectively of an articulated vehicle, and locking means operative to prevent substantial relative angular movement of said parts when the latter are in a relative position corresponding to the steering direction of the vehicle tractor, said locking means being releasable by steering movement of the tractor to permit relative movement of the tractor and trailer parts, by an amount and in a sense determined by the magnitude and sense respectively of the steering movement, said parts being again locked after such relative movement thereof.

The coupling unit of the present invention does not interfere with the normal handling characteristics of the vehicle, since whenever the tractor makes a steering movement the trailer is permitted to follow this movement. However, once the trailer has moved relatively to the tractor to the extent permitted by the steering movement of the tractor further relative movement of the trailer and tractor is prevented until a further steering movement is made. In circumstances where there is a tendency for slewing movement of either the tractor or the trailer, due, for example, to skidding, which is unaccompanied by a corresponding steering movement of the tractor, relative movement of the trailer and the tractor will not be permitted, and the tractor and trailer will remain effectively locked together. Under such circumstances, therefore, the articulated vehicle behaves in effect like a rigid vehicle, and has similar handling characteristics to such a vehicle.

In one embodiment of the invention the locking means comprise a locking cam attached rigidly to the trailer part, a plurality of displaceable locking elements carried by the tractor part, means biassing the elements into locking positions in which they engage a surface of said cam and prevent relative movement of the trailer and tractor parts, and a selector member, adjustable in response to a said steering movement, to displace at least one selected locking element from its locking position to permit relative movement of the tractor and trailer parts by an amount and in a sense determined by said steering movement.

The locking cam surface may conveniently be formed on or by a part of the pivot pin itself of the trailer. Thus in one embodiment of the invention the cam surface is formed on an external side wall of said king pin, said side wall being frusto-conical and the locking elements comprising complementary tapered rollers mounted for displacement parallel to the axis of the king pin into and out of their locking positions.

In an alternative embodiment, the cam surface is formed in an end face of the king pin and the locking elements comprise wedge-shaped or tapering shoes movable by the selector member radially with respect to the axis of the king pin. Alternatively, the cam surface is formed in an end face of the pivot pin and the locking elements comprise a plurality of shoes of tapering thickness supported on a horizontal surface for pivotal movement in pairs about vertical axis, said shoes surrounding an adjustable cam, constituting said selector member, which is rotatable about an axis colinear with the axis of the pivot pin to adjust the inclination relatively to each other of pairs of adjacent said shoes.

The locking means may comprise relatively rotatable parts attachable respectively to the tractor and the trailer for relative rotation about the axis of articulation of the trailer and a steering-controlled selector member which engages both said parts, the arrangement being such that relative rotation of the tractor and trailer parts is prevented by the selector member unless the selector member is freed for movement, in a sense and by an amount related to steering movements of the tractor, permitting relative rotation of the tractor and trailer parts to a new relative position in which said parts are again locked by the selector member.

The coupling unit preferably includes follow-up means operative, on relative movement of the said two parts, after release of the locking means as aforesaid, progressively to lock the two said parts against relative movement in the opposite direction.

The coupling unit of the invention may include release means manually operable when desired for rendering the locking means ineffective when desired to free the tractor and trailer parts for unimpeded relative angular movement.

There is also provided according to the invention an articulated vehicle having a steerable tractor and a trailer, locking means operative to lock the trailer relative to the tractor, and control means operatively controlled by the tractor steering mechanism to effect controlled release of the locking means in response to steering movements of said tractor.

Some embodiments of the invention will be described, by way of example only, with reference to the accompanying drawings, in which:

FIG. 2 is a vertical axial section through the coupling unit in FIG. 1;

Figure 1:
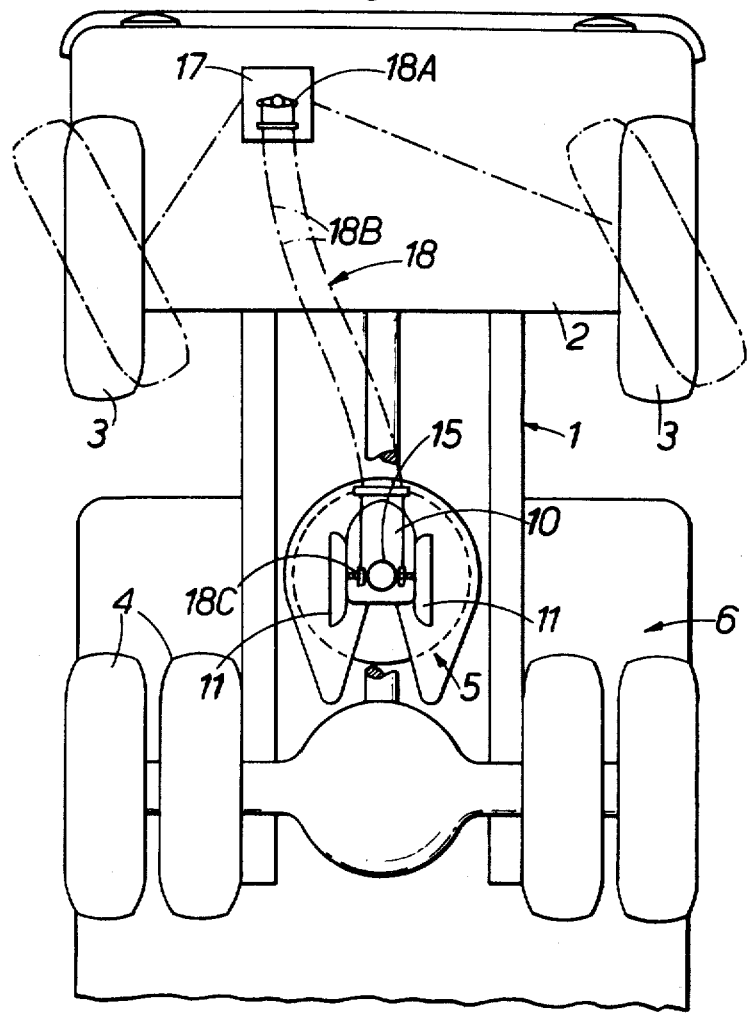
FIG. 1 is a diagrammatic plan view from below of the front part of an articulated vehicle incorporating a coupling unit according to a mechanical embodiment of the invention.

FIG. 1 shows the front part, viewed from below, of an articulated vehicle, in this case a lorry, comprising a tractor 1 having a driver's cab 2, steerable front wheels 3, driving wheels 4 and a so-called fifth wheel 5 supported by the chassis of the tractor 1 on cross members (not shown in the interests of clarity). The fifth wheel 5 has a generally horizontal supporting surface which supports the weight of the front end of a trailer 6 which is articulated relative to the tractor 1 about a substantially vertical king pin 7 (FIG. 2) the axis A—A of which passes through the center of the fifth wheel 5. The mounting of the fifth wheel 5, which is of well-known construction, permits relative pitching and rolling movement of the tractor 1 and trailer 6 when the vehicle is moving over hills and rough ground, while pivoting about the king pin 7 permits yawing or slewing movement of the trailer 6 relative to the tractor 1 when the vehicle is negotiating a bend.

In known articulated vehicles, the trailer has complete freedom of slewing movement relative to the tractor. In the vehicle according to the invention, however, the connection between the tractor 1 and the trailer 6 includes a coupling unit which effectively locks the trailer 6 against slewing or yawing angular movement relative to the tractor 1 except when the vehicle is negotiating a bend, when the trailer 6 is permitted to move angularly by an amount and in a sense determined by the movements of the steering mechanism of the tractor 1.

Referring to FIG. 2 a locking cam 8 is formed on the trailer king pin 7, said cam having two identical lobes 8a, 8b arranged diametrically opposite each other on an external side wall of the king pin 7 so that no resultant reaction acts on the trailer king pin 7 when the coupling unit is locked. The surface of the cam 8 is frusto-conical, tapering upwardly, and the locking elements co-operating with the cam 8 are shaped complementarily, each comprising a downwardly tapered roller 9 biassed downwardly by a biassing spring 20 into a locking position in which it is in face-to-face rolling contact with the frusto-conical surface of the cam 8. The rollers 9 are located in respective vertical grooves in the inner wall of a housing 10, each roller 8 when in its locking position standing proud of the inner peripheral surface of the housing 10 surrounding the pivot 7 (shown in broken outline at 10a in FIG. 2.) The housing 10 is itself positively positioned by the engagement of parallel flat external surfaces 11 on the housing between parallel guides 12, shown in FIG. 1 and again in broken outline in FIG. 2, provided on the fifth wheel 5.

A selector member comprising a circular selector cam 14 is arranged for rotation about the axis A—A of the king pin 7 by means of a selector shaft 15, coaxial with the king pin axis A—A, and supported in a central bearing 16, in the bottom of the housing 10. The upper peripheral surface of the selector cam 14 is formed with two diametrically opposed raised portions 14A and 14B as shown in FIG. 2A, arranged to engage the lower ends of the rollers 9 to lift the latter against the action of their biassing springs 20 out of locking engagement with the locking cam 8.

Typically the cam lobes 8a, 8b have constant curvature extending over angles of 30°, each raised portion of the selector cam 14 also extending over 30° and having on each side a sloping portion also extending over 30°, the remainder of the cam 14 being flat.

Figure 2A:
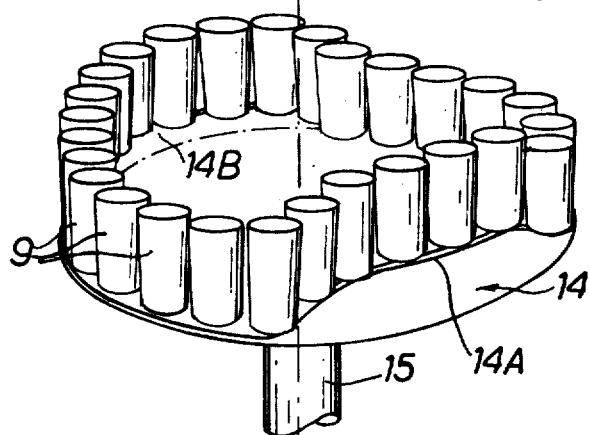
FIG. 2A is a diagrammatic perspective view of the selector cam and cooperating rollers in the embodiment of FIG. 2.
Figure 2B:
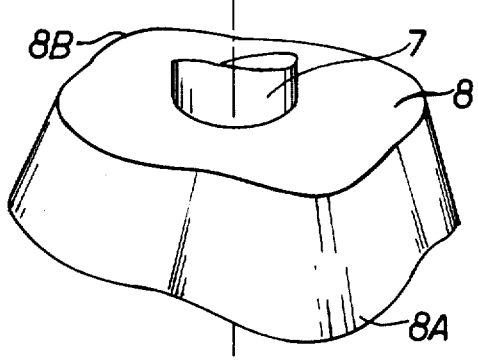
FIG. 2B is a diagrammatic perspective view of the locking cam in the emobidment of FIG. 2.

FIG. 2a and 2B are diagrammatic perspective views illustrating the profile of the locking cam 8, the selector cam 14 and the cooperating tapered rollers 9. The cam lobes 8a, 8b are exaggerated in this diagrammatic illustration. Similarly, the raised portions of the selector cam 14, indicated diagrammatically at 14a, 14b, are exaggerated. FIG. 2a shows how the selector cam 14 lifts selected rollers 9 clear of jamming engagement with the lobes 8a, 8b of the locking cam 8.

Any convenient form of transmission, mechanical, hydraulic or electro-mechanical, may be employed as a linkage transmitting movements from the steering mechanism of the tractor 1 to vehicle coupling unit.

In FIG. 1, the steering box of the tractor 1 is shown diagrammatically at 17 and, at 18, one form of such linkage. Bowden cables 18B connect a cross-bar 18A carried by the steering shaft of the steering box 17 to another cross bar 18C fast with the selector cam 14. The ends of cross bar 18C may be oppositely threaded so that the effective leverage can be adjusted by rotation of cross bar 18C, thereby giving the coupling unit an adjustable sensitivity to steering movements.

The mode of operation of the coupling unit will be apparent from the preceding description. When the tractor 1 and trailer 6 are in line with the steerable wheels 3 in the "straight ahead" position the raised portions 14A and 14B of the selector cam 14 are aligned with the lobes 8a, 8b, of the cam 8, lifting the locking elements 9 at these raised portions out of engagement with the cam 8. Those locking elements 9 on either side of the cam 8 are disposed fully in their locking positions. Consequently angular movement of the cam 8 is prevented, or at least limited, and the trailer 6 is effectively locked against slewing movement relative to the tractor 1.

When a steering movement of the wheels 3 is made by the driver of the tractor 1 a corresponding angular movement is transmitted from the steering mechanism 17 through the linkage 18 to the selector cam 14. This causes at least one of the locking elements 9 which had previously been in the locking position, to ride up on each raised portion of the selector cam 14, raising said locking element 9 out of its locking position and thereby permitting limited movement of the cam 8, in the same direction as the selector cam 14, and to a degree dependent upon the number of locking elements 9 which are raised and the height to which they are raised.

When the selector cam 14 has moved then the cam 8 is free to move, permitting rotation of the trailer king pin 7 and therefore slewing of the trailer 6 relative to the tractor 1. The linkage 18 is so arranged that the amount of rotation of the king pin 7 permitted by a given steering movement of the wheels 3 corresponds to that which the king pin 7 is normally required to make when the trailer 6 follows this steering movement. However, the cam 8 does not move through this permitted amount until the trailer 6 reaches the curve to be negotiated - the movement of the selector cam 14 merely permits the prescribed pivotal movement of the trailer king pin 7 as and when necessary. There may, for example, be a considerable delay between the steering movement initiated by the tractor driver and the slewing movement of trailer 6, particularly if the trailer 6 in question is at the end of a train of trailers.

As the trailer 6 follows the tractor 1 around the bend being negotiated and the cam 8 moves by the amount permitted by the selector cam 14, the locking elements 9 on the side of the cam 8 from which the cam 8 is receding, fall into their locking positions, so that by the time the cam 8 has moved completely through the angle permitted by the selector cam 14 it is again locked against further movement by the locking elements 9 until a further steering movement is made. By virtue of this "follow-up" action of the locking elements 9 reversal of the direction of slewing movement of the trailer 6 during its permitted movement is, therefore, effectively prevented.

It will be appreciated that the coupling unit effectively locks the trailer king pin 7 except when a steering movement is being made, when movement of the pin 7 and, therefore, of the trailer 6, is permitted to an extent and in a sense which is dictated by the steering movement of the tractor 1. Any attempt on the part of the trailer 6 to change the angle of the trailer 6 to the tractor 2, for example, as a result of skidding of the trailer 6, is in effect frustrated, as the trailer king pin 7 is locked until a tractor steering movement is made: consequently the trailer 6 and tractor 1 remain effectively locked together, and the vehicle behaves in the same manner as an unarticulated vehicle. Control of the vehicle in a skid or like emergency is then analogous to control of a conventional rigid vehicle, and special skill on the part of the driver, which has hitherto been called for, is unnecessary. Moreover, it is virutally impossible for the vehicle to get out of control beyond recovery and so jack-knife.

Figure 3:
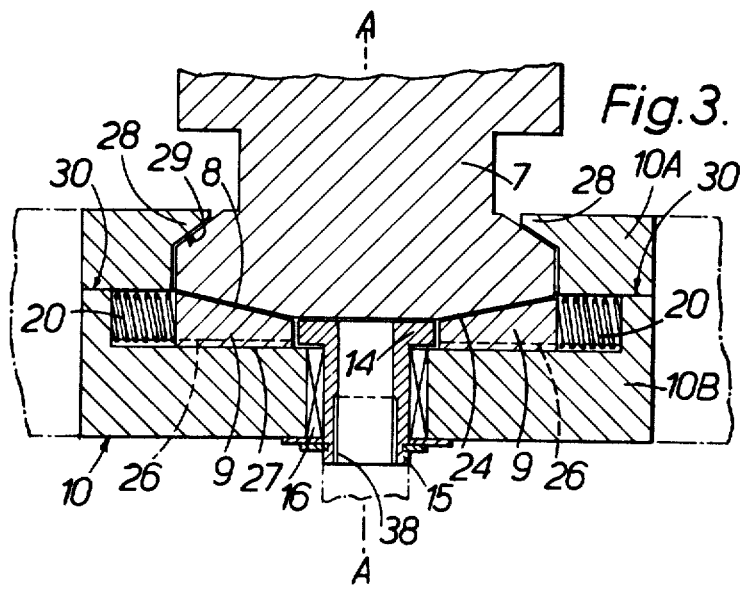
FIG. 3 is a vertical axial section through a coupling unit according to a further mechanical embodiment of the invention.
Figure 4:
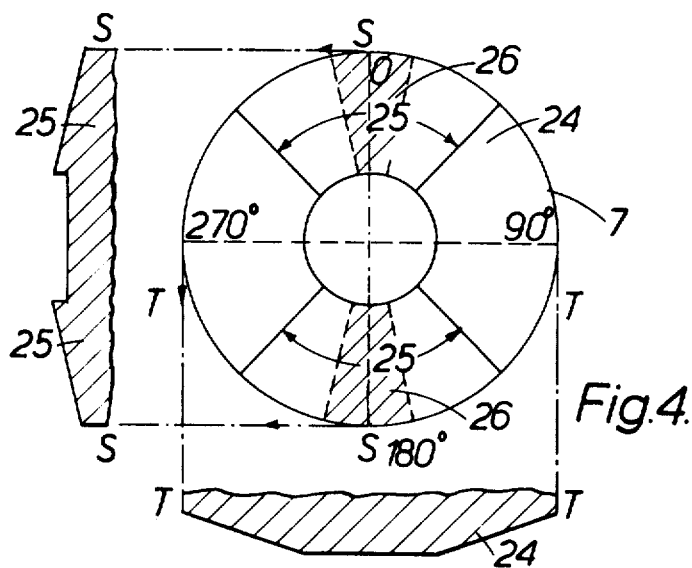
FIG. 4 is an underside plan view, accompanied by sectional views on lines S—S and T—T, of a modified trailer pin for use in conjunction with the coupling unit of FIG. 3.
Figure 5:
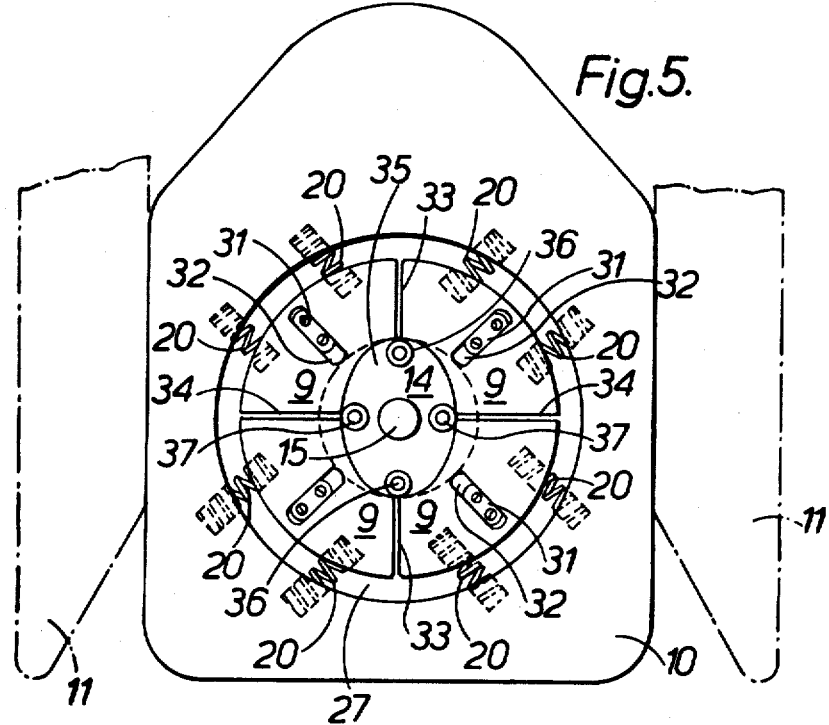
FIG. 5 is a diagrammatic top plan view of a coupling unit according to a yet further mechanical embodiment of the invention, with the trailer pivot pin omitted for the sake of clarity.

Further purely mechanical embodiments of the invention are illustrated in FIGS. 3 to 5. The mode of operation of these embodiments, in which parts corresponding to those of FIGS. 1 and 2 are indicated by the same reference numerals, will be apparent to the reader skilled in the art from the preceding description.

FIGS. 3 and 4 illustrate another variant of the mechanical form of coupling unit of the invention, in which the locking elements 9 are movable radially with respect to the axis of the trailer king pin 7, rather than parallel to said axis. In this embodiment the locking cam 8 is formed in the end face of the trailer king pin 7 by providing an annular bevelled cam track 24 on said end face. The track 24 has a so-called "heliconical" configuration, being formed with two diametrically opposed raised portions 25, each extending over substantially 90°, as illustrated in FIG. 4, the portions of the track 24 between said raised portions 25 being of uniform height. In a modification of this embodiment each of the two raised portions 25 of the cam track 24 may be flattended in the centers of their arcuate extents, as indicated by the shaded regions 26 in FIG. 4, to allow for the existence of a time lag between movement of the steering-controlled selector cam 14 and the corresponding movement of the trailer 6.

Figure 3A:
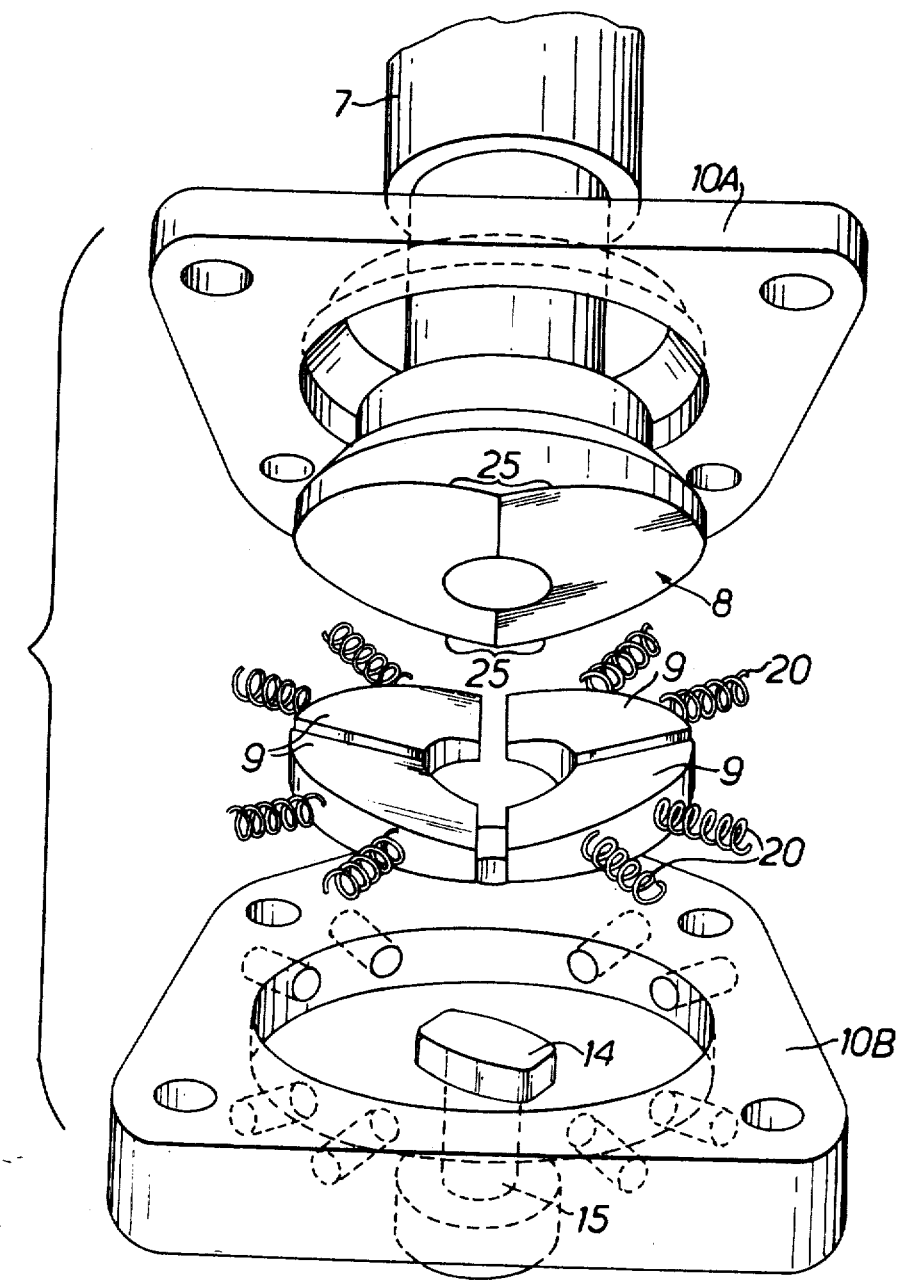
FIG. 3A is an exploded diagrammatic perspective view of the coupling unit shown in FIG. 3.

FIG. 3a illustrates, very diagrammatically, an exploded perspective view of the variant shown in FIGS. 3 and 4. The diametrically opposed raised portions 25 of the annular cam track 24 are shown in an exagerated form, without central flattened regions, for clearer illustration.

The locking elements comprise generally segment-shaped shoes 9 co-operating with the cam track 24 on the king pin 7, the shoes 9 being engaged with respective radial guides (not shown) in a horizontal face 27 of the housing 10. Each shoe 9 has a thickness which tapers both radially inwardly and circumferentially, the shoe having an upper surface which is parallel to the bevelled cam track 24. In the example of FIG. 4, four shoes 9, each extending over a sector of substantially 90°, are provided.

The shoes 9 are urged radially inwardly into contact with the cam track 24 by means of respective biassing springs 20 located in pockets in the housing 10 outwardly of the shoes 9. Engagement of the shoes 9 with the flanks of the raised portions 25 effectively jams the king pin 7, preventing rotation thereof relative to the housing 10.

Axial (ie.e. vertical) movement of the king pin 7 is prevented by an inwardly extending flange 28 having a conical underface which overhangs and mates with a frusto-conical annular upper face of cam 8.

The housing 10 has upper and lower parts 10A, 10B, divided as shown at 30, to facilitate assembly. Moreover, the upper housing part 10A, which is, in effect, a retaining plate for the end of the king pin 7, may be formed in two or more parts bolted to the lower housing part 10B to trap the king pin 7 in the housing 10 for rotation relative thereto.

A symmetrical twin-lobed selector cam 14 is carried by a selector shaft 15 mounted for rotation in a central bearing 16 in the housing 10, about an axis A—A colinear with the axis of the king pin 7. The shoes 9 are urged by the springs 20 into engagement at their radially inner ends with the surface of the selector cam 14, those shoes 9 engaging the two diametrically opposed lobes of the selector cam 14 being spaced sufficiently from the cam track 24 (as shown in FIG. 3A) by the cam 14 to clear the raised portions 25 of the locking cam 8 on the king pin.

FIG. 5 illustrates a modification of the embodiment of FIGS. 3 and 4 in which the locking cam 8 is again provided on a bevelled cam track 24 on the end face of the trailer king pin 7, as in the embodiment of FIGS. 3 and 4. In this modification, however, the movable locking elements comprise four identical segmental shoes 9 supported on the flat horizontal annular surface 27 such as in the housing 10, (as in FIG. 3), and abutting each other at their circumferential ends.

Each shoe 9 is contrained, by a rectangular peg 31, anchored to surface 27, acting in a radial slot or groove 32 in shoe 9, to move only radially of the axis of king pin 7 when engaged by the central selector cam.

Each shoe 9 tapers in thickness radially inwardly — that is, has a wedge-shaped cross section in vertical planes containing the axis of rotation A—A of the king pin 7. It is also tapered circumferentially so that a developed view of its outer surface will also be substantially wedge-shaped, the four shoes 9 collectively providing ridges 34 along one pair of diametrically opposite lines of contact between adjacent shoes and troughs 33 along the other pair of such lines of contact. The inner margins of the shoes 9 are together formed to a generally elliptical profile with the major axis along the line 33—33.

Each shoe 9 is spring-biassed into its locking position by a pair of thrust springs 20 located in the housing 10 outwardly of the shoe.

The selector cam 14 in this embodiment comprises a centrally disposed rotatable holder 35 having two pairs of diametrically opposed rollers 36 mounted thereon.

The holder 35 is connected to the selector shaft 15 for rotation therewith about an axis conincident with the axis A—A of the king pin 7. One pair of rollers, 36, are widely spaced apart to make contact with the inner profile of the shoes 9 along the major axis of the said elliptical profile; the other pair of rollers, 37, are spaced apart less widely to make contact with the said elliptical profile along the minor axis thereof.

When holder 35 is rotated, by selector shaft 15, rollers 36 force two diametrically opposite shoes 9 radially outwards enabling the raised portions 25 of the locking cam track 24 on the king pin, to advance into the sectors of these outwardly displaced shoes. Correspondingly rollers 37 permit the other pair of diametrically opposite shoes 9 to move radially inwards to prevent king-pin and hence trailer rotation in the opposite direction.

The drive connection between the selector cam 14 or the holder 35 in FIGS. 3 and 4 or FIG. 5 respectively and the selector shaft 15 may comprise a splined coupling (as shown at 38 in FIG. 3) or any other suitable connection which may be made when the tractor and trailer are coupled together. For example, the lower end of the holder 35 in FIG. 5 may be formed with a forwardly-facing V-shaped slot which engages with a V-shaped male part, facing rearwardly when the steering is central, provided on the selector shaft 15 when the coupling unit is correctly positioned between the guides 12 on the fifth wheel 5, the interengaging V-shaped parts being then locked together by rotation through 180° of a surrounding locking ring having an opening for admitting the male part upon assembly of the unit.

The mode of operation of the embodiment of FIGS. 3 to 4 will be apparent to those skilled in the art from the preceding description. The segmental shoes 9 are urged by the springs 20 into contact with the bevelled cam track 24, and on account of their circumferential taper, the shoes 9 jam against the flanks of the raised portions 25 of the cam 8, effectively locking the trailer king pin 7 to the housing 10 attached to the tractor. Those shoes 9 which are engaged by the lobes of the selector cam 14, shown exaggerated in FIG. 3a, are displaced radially outwardly against their respective springs 20 sufficiently to release them from jamming engagement with the raised portions of the cam 9, permitting relative rotation of the king pin 7 and the housing 10. After a small amount of such rotation the cam 8 on the king pin 7 again comes into jamming engagement with the remaining shoes 9, unless these shoes have previously been displaced out of the path of the raised cam portions 25 by a corresponding movement of the steering-controlled selector cam 14. It will be apparent, therefore, that the selective jamming action of the shoes 9 with the cam 8 is such that relative rotation of the king pin 7 and the tractor-mounted housing 10 is permitted only in a sense and by an amount dictated by the steering movements app lied to the selector cam 14.

Figure 6:
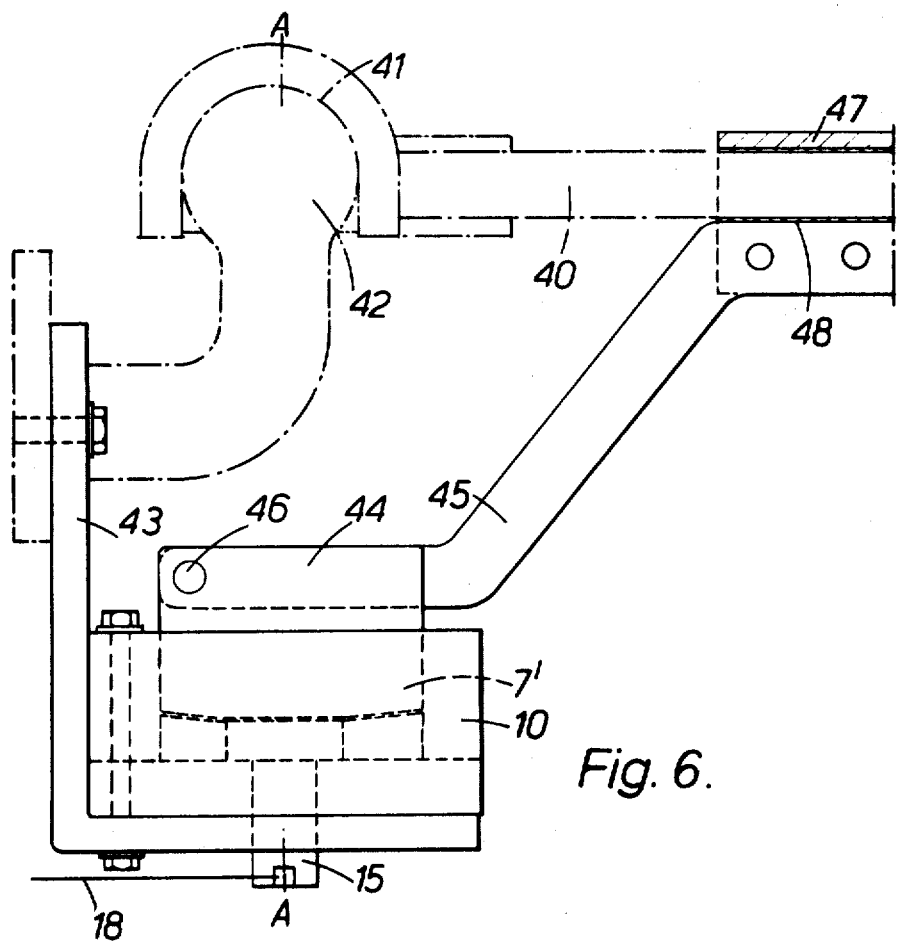
FIG. 6 is a diagrammatic side elevation of a coupling unit according to the invention, illustrating its application to a motor car/caravan articulated coupling.

FIG. 6 illustrates the application of the coupling unit of the invention to the coupling between a caravan or trailer to a towing vehicle.

The trailer has a forwardly extending towing link 40, shown in broken outline, which terminates in a downwardly-facing hemispherical socket 41 in which a ball 42 carried by the towing vehicle is fitted. This constitutes the conventional caravan or trailer towing linkage.

The coupling unit according to the invention has a downwardly extending mounting bracket 43 attached to the towing vehicle and supports the housing 10 of the coupling unit, such as that of FIG. 3. However, the bevelled locking cam 8 instead of being formed on the lower end of a king pin 7 is formed on an end face of a rotatable plate 7'. The plate 7' supports on its upper face two parallel lugs 44 between which a coupling bar 45 is received, the bar 45 being pivotally attached to the lugs 44 by means of a quick-release hinge pin 46 extending between the lugs 44. The coupling bar 45 is attached by way of U-bolts 47 to the towing link 40, a plastics sleeve 48 being interposed between the U-bolts 47 and the link 40 to permit rotational movement of the link 40 about its axis upon rolling movement of the trailer and sliding movement upon pitching movement of the trailer. The hinge pin 46 permits bar 45 to swing relative to plate 7', on pitching movement of the trailer relative to the towing vehicle.

Any slewing or yawing movement of the trailer relative to the towing vehicle tends to rotate the plate 7' relative to the housing 10, about the axis A—A of the latter and this is in general resisted by the coupling unit, as previously described, except in response to a steering movement of the towing vehicle, transmitted to the unit by way of a linkage 18 to the selector shaft 15 of the coupling unit.

Figure 7:
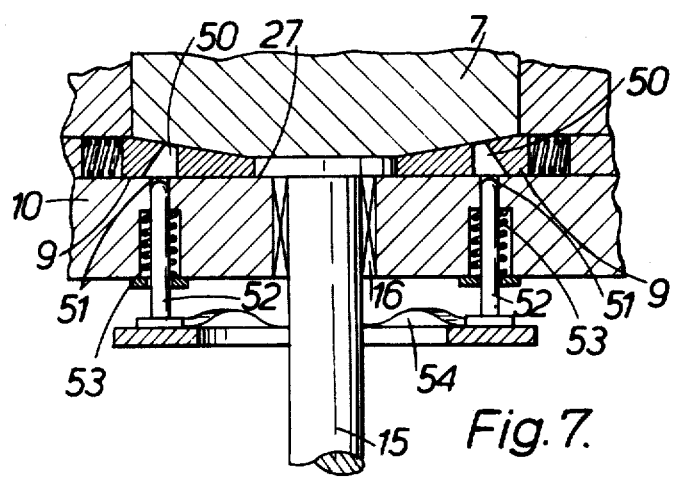
FIG. 7 is a diagrammatic cross sectional view, corresponding to FIG. 3 showing a modification of the coupling unit of FIG. 3 to include manually operable release means.

The coupling unit according to the invention may conveniently be provided with release means operable by the tractor driver to render the coupling locking means ineffective when desired to free the tractor and trailer parts for unimpeded relative angular movement. FIG. 7 illustrates part of the coupling unit of FIG. 3 modified by the addition of a mechanical release device. Each shoe 9 has a profiled recess 50 in its lower surface, and the flat supporting face 27 of the housing 10 has a number of drillings 51 aligned with the recesses 50. Respective cam follower pins 52 are slidable vertically in the drillings 51 and are biassed forwardly by respective springs 53 into sliding engagement with a release cam 54 which is rotatable about an axis A—A coinciding with the axis of the king pin 7. A spring (not shown) urges the cam 54 into an angular position in which the pins 52 are disengaged from the shoes 9, permitting normal operation of the coupling unit, as previously described. A manually operable release cable (not shown) controlled from the tractor cab acts on the cam 54 and when pulled rotates the cam 54 into an operative position to lift the pins 52 into the recesses 50. The recesses 50 are so profiled that when the pins 52 engage in the recesses 50 all the shoes 9 are displaced radially outwardly and withdrawn from operative engagement with the locking cam 8 on the end face of the king pin 7, permitting free rotation of the king pin 7 relative to the housing 10.

Although the preferred embodiments of the invention described herein employ mechanically and hydraulically movable locking elements to effect a locking of the coupling unit, it will be understood that in principle any suitable servo system whether mechanically, electrically or fluid pressure operated, may be used to effect locking of the coupling unit and selective unlocking of the unit in response to signals representing tractor steering movements.

I claim:

1. An articulated vehicle coupling unit comprising:

a tractor part and a trailer part for attachment to the tractor and trailer respectively of an articulated vehicle;

a locking cam attached rigidly to the trailer part;

a plurality of displaceable locking elements carried by the tractor part;

means biassing said locking elements into locking positions in which they engage a surface of said cam and prevent relative movement of the trailer and tractor parts, and a steering-responsive selector member connectible to the tractor and adjustable in response to a steering movement of said tractor to displace at least one selected locking element from its locking position to permit relative movement of the tractor and trailer parts only by an amount and in a sense determined by the magnitude and sense of said steering movement.

2. Coupling unit as claimed in claim 1, in which the trailer part comprises a king pin pivotally engageable with the tractor part, and in which the locking cam surface is carried by the trailer king pin.

3. Coupling unit as claimed in claim 2, in which the cam surface is formed on an end face of the king pin and the locking elements comprise shoes tapering in at least a radial direction with respect to the axis of the king pin and means guiding the shoes for movement in said radial direction with respect to the tractor part.

4. Coupling unit as claimed in claim 3, in which each of said shoes tapers additionally in a circumferential direction with respect to the king pin axis.

5. Coupling unit as claimed in claim 1, in which the selector member comprises a rotatable selector cam which makes sliding contact with the locking elements.

6. Coupling unit as claimed in claim 1, including manually operable release means operable when desired for rendering the locking means ineffective to free the tractor and trailer parts for unimpeded relative angular movement.

7. Coupling unit as claimed in claim 1, in which the selector member comprises a cam which allows displacement into their locking positions of those locking elements which are effective to obstruct a reverse relative rotation of said tractor and trailer parts, following a change in the tractor/trailer angle, thereby locking said tractor and trailer parts at a tractor/trailer angle corresponding to the steering direction of the tractor.

8. Coupling unit as claimed in claim 1, including a displaceable release cam and a number of cam followers, one for each locking element engaged by said release cam, said cam followers acting on the respective locking elements simultaneously to move all the locking elements out of their locking positions upon displacement of the release cam from an inoperative position in which none of the locking elements is released by a said cam follower.

9. An articulated vehicle having a steerable tractor and a trailer and a coupling unit interconnecting said tractor and trailer for relative articulation, said coupling unit comprising:

a locking cam rigidly attached to the trailer;

a plurality of displaceable locking elements carried by the tractor;

means biassing said locking elements into locking positions in which they engage a surface of said cam and prevent relative movement of the trailer and tractor, and a steering-responsive selector member connectible to the tractor and adjustable in response to a steering movement of said tractor to displace at least one selected locking element from its locking position to permit relative movement of the tractor and trailer only by an amount and in a sense determined by the magnitude and sense of said steering movement.

* * * * *